United States Patent
Rymkowski et al.

(10) Patent No.: US 10,198,839 B2
(45) Date of Patent: Feb. 5, 2019

(54) STYLE TRANSFER-BASED IMAGE CONTENT CORRECTION

(71) Applicant: Apple Inc., Cupertino, CA (US)

(72) Inventors: Bartlomiej W. Rymkowski, San Jose, CA (US); Marco Zuliani, San Jose, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 15/273,674

(22) Filed: Sep. 22, 2016

(65) Prior Publication Data

US 2018/0082407 A1 Mar. 22, 2018

(51) Int. Cl.
*G06K 9/48* (2006.01)
*G06T 11/60* (2006.01)

(52) U.S. Cl.
CPC .................................. *G06T 11/60* (2013.01)

(58) Field of Classification Search
CPC G06T 5/005; G06T 11/60; G06T 2207/20084
USPC ....... 382/275, 266, 254, 276, 284, 181, 190, 382/195, 199, 173; 345/418, 441, 442, 345/581, 589, 419, 426, 582, 588, 467, 345/470, 619, 629, 634, 639, 593; 434/81, 84, 94, 365, 371
See application file for complete search history.

(56) References Cited

U.S. PATENT DOCUMENTS

| | | | |
|---|---|---|---|
| 5,680,475 A | | 10/1997 | Zwierski |
| 6,011,536 A | * | 1/2000 | Hertzmann .............. B44F 11/02 345/156 |
| 6,973,130 B1 | | 12/2005 | Wee et al. |
| 7,933,454 B2 | | 4/2011 | Bressan |
| 8,160,396 B2 | | 4/2012 | Brand |

(Continued)

FOREIGN PATENT DOCUMENTS

| | | |
|---|---|---|
| CN | 106327448 A | 1/2017 |
| WO | 2017021322 A1 | 2/2017 |

OTHER PUBLICATIONS

"Will photo art phenom Prisma raise or get bought?" TechCrunch, Retrieved from the Internet: URL:https://techcrunch.com/2016/07/19/prismagram/ [Retrieved on Jul. 20, 2016].

(Continued)

*Primary Examiner* — Sheela C Chawan
(74) *Attorney, Agent, or Firm* — Blank Rome LLP (57) ABSTRACT

Techniques are disclosed herein for applying an artistic style extracted from one or more source images, e.g., paintings, to one or more target images. The extracted artistic style may then be stored as a plurality of layers in a neural network. In some embodiments, two or more stylized target images may be combined and stored as a stylized video sequence. The artistic style may be applied to the target images in the stylized video sequence using various optimization methods and/or pixel- and feature-based regularization techniques in a way that prevents excessive content pixel fluctuations between images and preserves smoothness in the assembled stylized video sequence. In other embodiments, a user may be able to semantically annotate locations of undesired artifacts in a target image, as well as portion(s) of a source image from which a style may be extracted and used to replace the undesired artifacts in the target image.

17 Claims, 9 Drawing Sheets

(56) References Cited

U.S. PATENT DOCUMENTS

| | | | | |
|---|---|---|---|---|
| 8,189,920 | B2* | 5/2012 | Tomizawa | G06K 9/033 |
| | | | | 382/182 |
| 8,355,592 | B1 | 1/2013 | Shechtman | |
| 8,896,622 | B2* | 11/2014 | Winnemoeller | G06T 11/00 |
| | | | | 345/619 |
| 9,036,898 | B1* | 5/2015 | Beeler | G06T 19/20 |
| | | | | 382/154 |
| 9,105,117 | B2 | 8/2015 | Asente | |
| 9,135,732 | B2 | 9/2015 | Winn | |
| 9,208,539 | B2* | 12/2015 | Choudhury | G06T 5/00 |
| 9,536,293 | B2 | 1/2017 | Lin | |
| 9,552,510 | B2 | 1/2017 | Li | |
| 9,594,977 | B2 | 3/2017 | Lin | |
| 9,665,930 | B1* | 5/2017 | Bedi | G06T 11/60 |
| 9,799,099 | B2* | 10/2017 | Yang | G06T 5/001 |
| 2009/0185747 | A1 | 7/2009 | Segall et al. | |
| 2011/0081093 | A1 | 4/2011 | Racape et al. | |
| 2014/0241592 | A1 | 8/2014 | Yang | |
| 2015/0224395 | A1 | 8/2015 | Trombetta et al. | |
| 2015/0339570 | A1 | 11/2015 | Scheffler | |
| 2015/0371447 | A1 | 12/2015 | Yasutake | |
| 2016/0034788 | A1 | 2/2016 | Lin | |
| 2016/0225164 | A1 | 8/2016 | Tomlin et al. | |
| 2017/0140253 | A1 | 5/2017 | Wshah | |
| 2017/0213112 | A1 | 7/2017 | Sachs | |
| 2017/0220854 | A1 | 8/2017 | Yang | |
| 2018/0082715 | A1 | 3/2018 | Rymkowski | |

OTHER PUBLICATIONS

Azad, et al., "Bangladeshi Style: a Way of Facial Artistic Stylization in Visual Effects," 16th Int'l Conf. Computer and Information Technology, Mar. 8-10, 2014, Khulna, Bangladesh.

Gatys, Leon A., Alexander S. Ecker, and Matthias Bethge. "A neural algorithm of artistic style." arXiv preprint arXiv:1508.06576 (2015).

Kwatra et al., "Texture Optimization for Example-based Synthesis," Association for Computing Machinery, Inc., 2005.

Gatys, et al., "Image Style Transfer Using Convolutional Neural Networks," IEEE Conference on Computer Vision and Pattern Recognition (CVPR), Jun. 27-30, 2016.

Huang, et al., "Real-Time Neural Style Transfer for Videos," IEEE Conference on Computer Vision and Pattern Recognition (CVPR), 2017, pp. 783-791.

Jing, et al., "Neural Style Transfer: A Review," arXiv:1705.04058v1, May 11, 2017.

Li, Multimodal 2D+3D Facial Expression Recognition with Deep Fusion Convolutional Neural Network, IEEE Transactions on Multimedia, vol. PP, Issue: 99, 2017.

Novak, et al., "Improving the Neural Algorithm of Artistic Style," Ecole normale superieure de Cachan, Cachan, France, May 15, 2016.

Ruder, et al., "Artistic style transfer for videos," arXiv:1604.08610v2, Oct. 19, 2016.

Yan, et al., "Automatic Photo Adjustment Using Deep Neural Networks," ACM Transcations on Graphics, May 16, 2015.

* cited by examiner

STYLE TRANSFER-BASED IMAGE CONTENT CORRECTION

TECHNICAL FIELD

This disclosure relates generally to the field of digital image processing. More particularly, but not by way of limitation, it relates to techniques for applying an artistic style extracted from a source image onto a target image.

BACKGROUND

The advent of portable integrated computing devices has caused a wide proliferation of cameras and video devices. These integrated computing devices commonly take the form of smartphones or tablets and typically include general purpose computers, cameras, sophisticated user interfaces including touch sensitive screens, and wireless communications abilities through WiFi, Long Term Evolution (LTE), High Speed Downlink Packet Access (HSDPA) and other cell-based or wireless technologies (WiFi is a trademark of the Wi-Fi Alliance, LTE is a trademark of the European Telecommunications Standards Institute (ETSI)). The wide proliferation of these integrated devices provides opportunities to use the devices' capabilities to perform tasks that would otherwise require dedicated hardware and software. For example, as noted above, integrated devices such as smartphones and tablets typically have one or two embedded cameras. These cameras generally amount to lens/camera hardware modules that may be controlled through the general purpose computer using firmware and/or software (e.g., "Apps") and a user interface, e.g., including a touch-screen interface and/or touchless control, such as voice control.

The integration of cameras into communication devices such as smartphones and tablets has enabled people to share images and videos in ways never before possible. It is now very popular to acquire and immediately share images and/or videos with other people by either sending the photos via text message, by SMS, by email, though Apps, or by uploading the photos to an Internet-based website, such as a social networking site or a photo sharing site. User often desire to apply one or more corrective or artistic filters to their images and/or videos before sharing them with other users or posting them to Internet-based websites. Some such filters may modify the images in a content-independent fashion, e.g., a vignetting effect that darkens the outer borders of the image. Other filters may perform one or more color or brightness mapping techniques to improve the appearance of the image. Still other filters may manipulate each pixel in a programmatically-defined fashion to create a particular "effect," e.g., an antique image effect or a black and white effect.

However, more and more, users desire the ability to apply more complex artistic effects to their captured images and/or video that do not simply perform a mathematical mapping of each pixel value in the image to generate an output image, but instead use artificial intelligence to imbue the 'essence' of a particular artistic style to their captured images and/or video. One such approach for applying artistic styles to images has been proposed in Gatys et al., "A Neural Algorithm of Artistic Style," arXiv:1508.06576v2 [cs.cV], 2 Sep. 2015 (which paper is hereby incorporated by reference and referred to hereinafter as, "Gatys,") and provides a neural algorithm that separates and recombines the content and style of arbitrary images to synthesize artistic versions of the input images. However, the algorithm proposed in Gatys takes a significant amount of time to apply an artistic style to a single image, and also requires a substantial amount of processing power, which is not typically available on users' personal electronic devices.

Due to the substantial time and processing requirements imposed by the Gatys algorithm, the assembly of a stylized video sequence of any substantial length in time (e.g., comprising more than a few dozen frames of video) is not feasible, given the time and processing constraints faced by personal electronic devices. Moreover, a naïve application of the artistic style transfer techniques of Gatys to each image in a sequence of images results in an assembled video sequence that has an undesirable amount of random 'jitter' or 'flicker' around moving and non-moving objects in the images due, at least in part, to the stochastic nature of the style transfer process. Moreover, it would also be desirable for users to be able to extract artistic styles from a portion comprising less than the entire source image (i.e., rather than using entire images as the artistic sources) and using the style extracted from said portion to automatically content-correct one or more undesired artifacts in a target image, or even in another portion of the source image.

SUMMARY

Techniques are disclosed herein for applying an artistic style extracted from one or more source images, e.g., paintings, to one or more target images. The extracted artistic style may then be stored as a plurality of layers in a neural network. In some embodiments, two or more stylized target images may be combined and stored as a stylized video sequence. The artistic style may be applied to the target images in the stylized video sequence using various optimization methods and/or pixel- and feature-based regularization techniques in a way that prevents excessive content pixel fluctuations between images and preserves smoothness in the assembled stylized video sequence. In other embodiments, a user may be able to semantically annotate locations of undesired artifacts in a target image, as well as portion(s) of a source image from which a style may be extracted and used to replace the undesired artifacts in the target image.

Various non-transitory program storage devices are disclosed. The program storage device are readable by one or more processors. Instructions may be stored on the program storage devices for causing the one or more processors to: obtain a first source image, e.g., an image of a painting; extract an artistic style from the first source image; obtain a first target image captured at a first time; apply the artistic style to the first target image to create a stylized version of the first target image; obtain a second target image captured at a second time; apply the artistic style to the second target image to create a stylized version of the second target image; combine the stylized version of the first target image and the stylized version of the second target image to create a first stylized video sequence; and store the stylized video sequence in a memory.

Other embodiments of non-transitory program storage devices are also disclosed. In one such embodiment, the artistic style may be stored as a plurality of layers in a neural network, wherein each layer in the neural network encodes some information about the style source image. In other embodiments, the instructions may further comprise instructions to determine a "scene classification" for the target image(s), and then obtain a source image based on the determined scene classification. For example, a stylized painting of a sunset may be a more effective source image for a target image of a sunset than it would be for a target image of a bicycle.

In other embodiments, applying the artistic style to the second target image may comprise initializing an optimization process with the stylized versions of one or more other target images in the video sequence, e.g., the stylized version of the first target image. In other words, owing to its stochastic nature, the application of the artistic style to the target image may cause objects within the image to move small amounts in random directions within the image that are unrelated to the actual movement of the objects within the scene between the first time (i.e., when the first target image was captured) and the second time (i.e., when the second target image was captured). By using the stylized versions of other target images (e.g., a neighborhood of one or more images captured before and/or after the current frame) to 'guide' the stylization process of the second image, e.g., in the form of a cost function that assigns lower costs to features in the stylized version of the second target image that end up in a similar location and/or with a similar color composition to the analogous features in the neighborhood of one or more previous and/or subsequent image(s) in the video sequence, the amount of random 'jitter' or 'flicker' around objects as the assembled video sequence is played may be reduced.

In some embodiments, the artistic style may be applied to the target images in a multi-pass process. In a first pass, an initial stylization pass may be applied to each of the target images in the video sequence for which a user desires to generate initial stylized versions. Next, in a second pass, a random permutation of the frame indices may be generated. Then, each initially-stylized frame may be iterated over in order (i.e., in the order of the randomly-generated permutation of indices). During the iteration process, each initially-stylized frame may be blended with the initially-stylized versions of the target images in the neighborhood of one or more images captured before and/or after the current frame, in order to generate an interpolated initialization frame for the 'second pass' stylization of each frame. The interpolated initialization frame may then be used as a starting point for the optimization of the application of the artistic style to the current image in the second pass. The second pass process (i.e., generating the random permutation of indices and optimizing the stylization of each frame using the initial stylized versions of neighboring frames as inputs) may then be repeated as many additional times as is desired by a user, or until a desired stylization quality has been achieved.

Various methods of creating stylized video sequences are also disclosed herein, in accordance with the program storage device embodiments enumerated above. Various programmable electronic devices are also disclosed herein, in accordance with the program storage device embodiments enumerated above. Such electronic devices may include one or more optical sensors/camera units; a display; a user interface; a programmable control device; and a memory coupled to the programmable control device. Instructions may be stored in the memory, the instructions causing the programmable control device to execute instructions in accordance with the various program storage device embodiments enumerated above.

According to still other embodiments disclosed herein, other non-transitory program storage devices, readable by one or more processors, are disclosed. Instructions may be stored on such program storage devices for causing the one or more processors to: obtain a first source image; extract an artistic style from at least a portion of the first source image; obtain a first target image comprising one or more undesired artifacts; obtain semantic information from the first target image corresponding to the one or more undesired artifacts; apply the extracted artistic style to the first target image in accordance with the semantic information to repair the one or more undesired artifacts, thereby creating a content corrected version of the first target image; and store the content corrected version of the first target image in a memory.

Other embodiments of non-transitory program storage devices are also disclosed. In one such embodiment, the artistic style may be stored as a plurality of layers in a neural network, wherein each layer in the neural network encodes some information about the style source image. In other embodiments, the first source image and the first target image may be the same image. In such embodiments, it may be the case that the portion of the first source image from which the artistic style is extracted does not contain any of the one or more undesired artifacts. E.g., if the source image and target image are the same image of an outdoor scene of a sunset but there is a bird or other insect in the sky that the user wishes to remove, the "style" of the sunset may be extracted from a portion of the image containing sky that does not contain the unwanted bird or other insect, and then the "style" may be applied to the region where the unwanted bird or other insect is located, such that the content correction is not readily perceivable to a viewer of the image, due to the fact that the region containing the undesired artifacts is replaced with content pixels sharing a similar style to the rest of the sky in the image.

In other embodiments, an indication of the location of the portion of the source image from which the artistic style is to be extracted and/or the location of the one or more undesired artifacts may be received via a user interface, e.g., comprising a touchscreen display, input from a mouse, keyboard, or microphone, etc., or such locations may be located automatically or programmatically. In other embodiments, the application of the artistic style to the first target image may comprise the utilization of one or more optimization techniques, e.g., a customized cost function. In still other embodiments, the content-corrected regions of the first target image may be blended together, e.g., using a Poisson blending technique, with the uncorrected regions of the first target image, so as to soften the transition between the corrected and uncorrected portions of the first target image.

Various methods of creating content-corrected images using extracted artistic styles are also disclosed herein, in accordance with the program storage device embodiments enumerated above. Various programmable electronic devices are also disclosed herein, in accordance with the program storage device embodiments enumerated above. Such electronic devices may include one or more optical sensors/camera units; a display; a user interface; a programmable control device; and a memory coupled to the programmable control device. Instructions may be stored in the memory, the instructions causing the programmable control device to execute instructions in accordance with the various program storage device embodiments enumerated above.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As explained in Gatys, one class of Deep Neural Networks (DNN) that are especially powerful in image processing tasks are known as Convolutional Neural Networks (CNNs). Convolutional Neural Networks consist of layers of small computational units that process visual information in a hierarchical fashion, e.g., often represented in the form of "layers." The output of a given layer consists of so-called "feature maps," i.e., differently-filtered versions of the input image. The information each layer contains about the input image can be directly visualized by reconstructing the image only from the feature maps in that layer. Higher layers in the network capture the high-level "content" in terms of objects and their arrangement in the input image but do not constrain the exact pixel values of the reconstruction. To obtain a representation of the "style" of an input image, Gatys proposes using a feature space that is built on top of the filter responses in multiple layers of the network and that consists of the correlations between the different filter responses over the spatial extent of the feature maps.

Because the representations of the content and the style of an image may be independently separated via the use of the CNN, both representations may also be manipulated independently to produce new and interesting (and perceptually meaningful) images. For example, as is explained in further detail below, new "stylized" versions of images may be synthesized by finding an image that simultaneously matches the content representation of the photograph (i.e., the "target image") and the style representation of the painting or other work of art that serves as the source style inspiration (i.e., the "source image"). Effectively, this synthesizes a new version of the photograph in the style of the artwork, such that the appearance of the synthesized image resembles the work of art stylistically, even though it shows generally the same content as the photograph.

Figure 1:
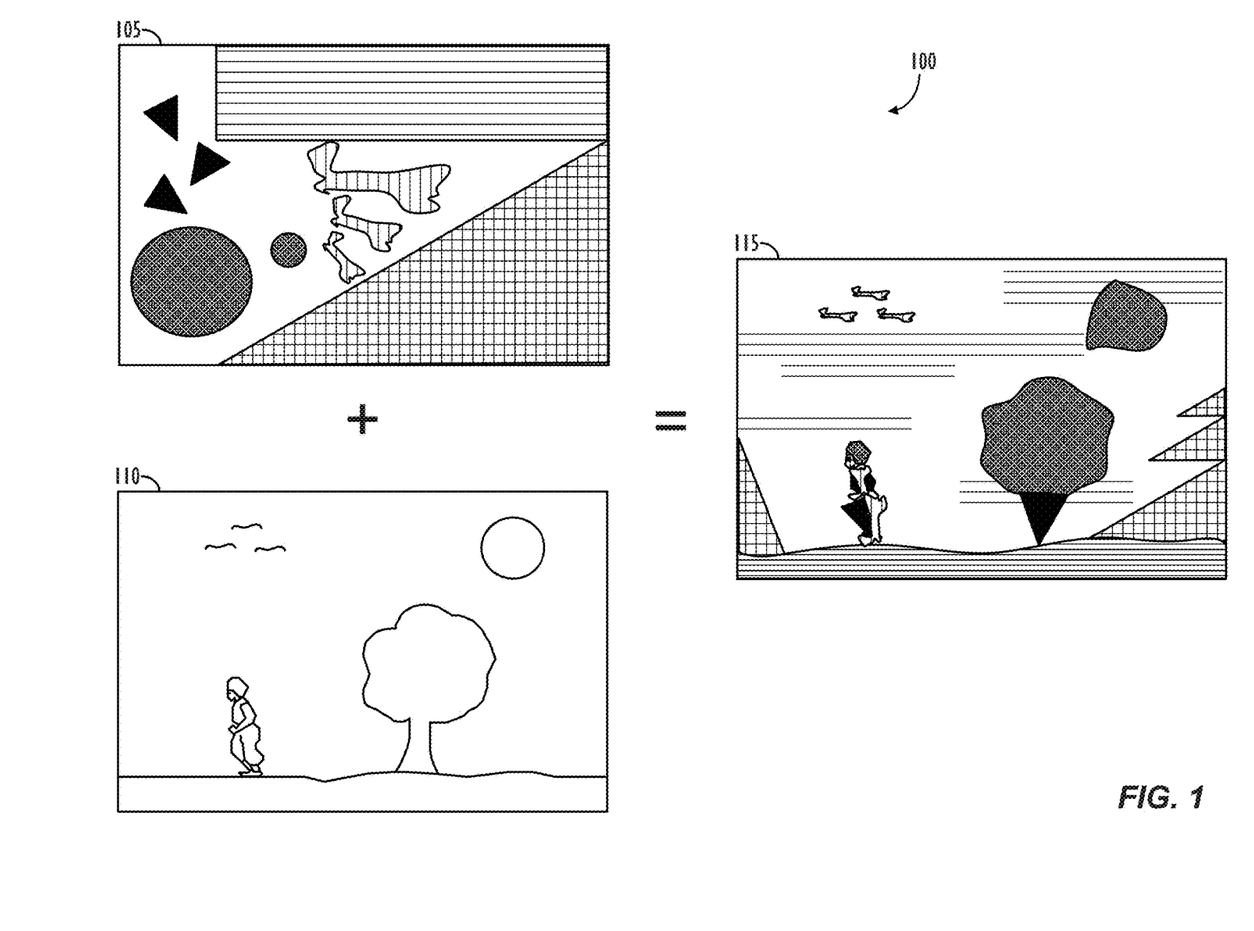
FIG. 1 is an example of an application of an extracted artistic style to a target image, according to one or more embodiments.

Referring now to FIG. 1, an example 100 of an application of an extracted artistic style to a target image is shown, according to one or more embodiments. In example 100, image 105 serves as the source image from which the artistic style will be extracted, and image 110 is the target image that will have the extracted artistic style applied to it to create a stylized version of the target image. In example 100, image 115 represents the resultant stylized version of the target image.

As may now be more fully appreciated, the stylized version of the target image 115 largely retains the same content as the unstylized version of the target image 110. For example, the stylized version of the target image 115 retains the basic layout, shape and size of the main elements of the unstylized version of the target image 110, such as the runner, the tree, the Sun, and the three birds in the sky. However, various elements extracted from the artwork source image 105 are perceivable in the stylized version of the target image 115. For example, the texture from inside the two circles in source image 105 was applied to the Sun and the tree in the stylized version of the target image 115, while the shapes of the Sun and tree have been modified slightly, e.g., based on the contours of the three wavy, vertically-striped objects in the center of source image 105; the style of the black triangles from the source image 105 appear in the arms and legs of the runner and in the trunk of the tree in the stylized version of the target image 115; the horizontally-striped texture from the top of source image 105 was applied to the ground and portions of the sky in the stylized version of the target image 115; the square-filled triangular-shaped texture from the lower-right corner of source image 105 was applied to various portions of the stylized version of the target image 115 in triangular regions; and the contours and texture of the three wavy, vertically-striped objects in the center of source image 105 were applied to the birds in the stylized version of the target image 115.

As is to be understood, the stylized version of the target image 115 shown in FIG. 1 is merely exemplary of the types of style representations that may be extracted from a source image and applied to a target image. In a given implementation, the granularity of the style representations that are extracted from the source image and the degree to which one or more source image styles are combined and/or applied to the target image may each be customized to desired levels, e.g., so as to achieve a resulting stylized target image that is visually interesting.

Figure 2:
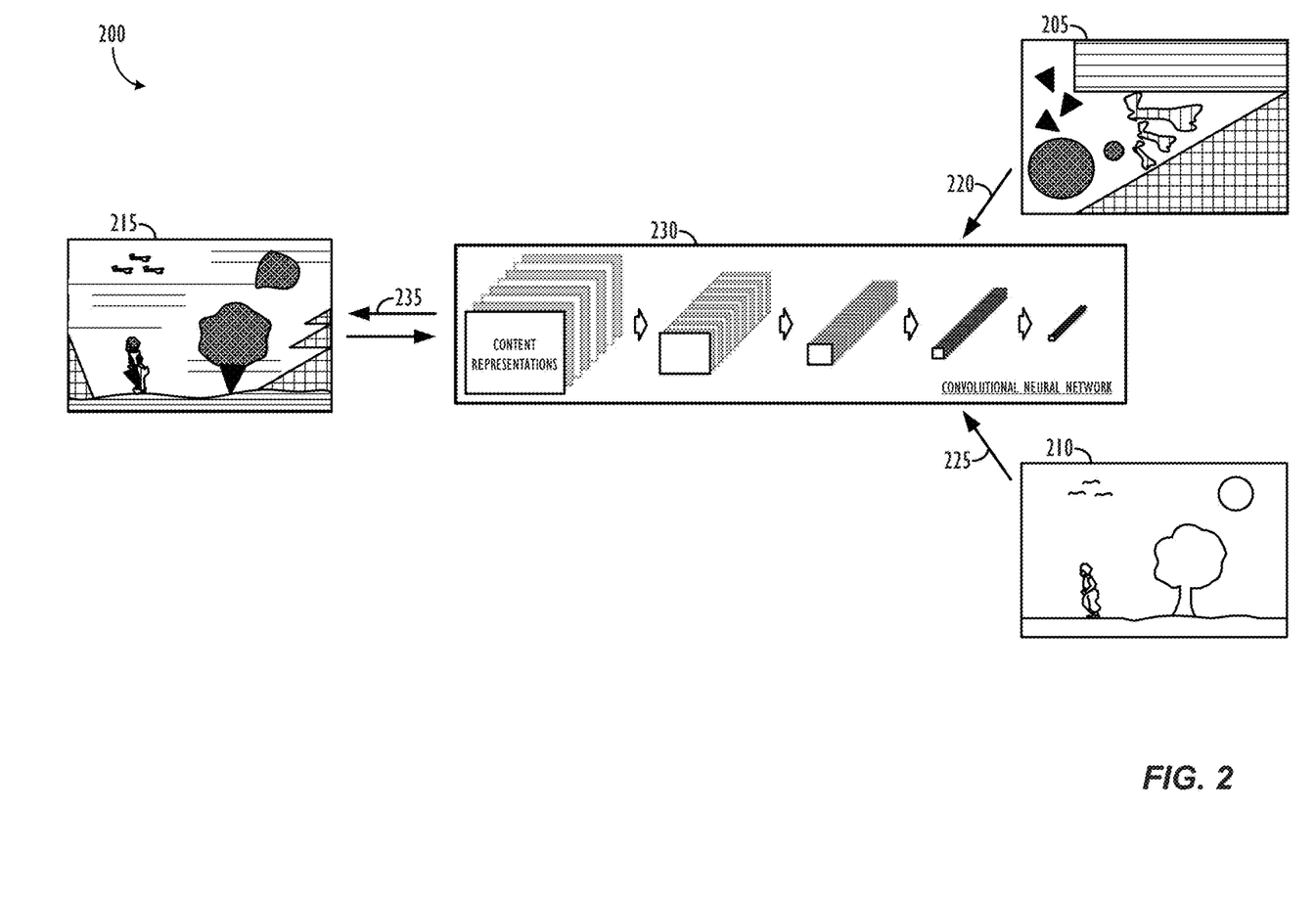
FIG. 2 is an example of a neural network for applying an extracted artistic style to a target image, according to one or more embodiments.

Referring now to FIG. 2, an example 200 of a neural network 230, e.g., a convolutional neural network (CNN), for applying an extracted artistic style to a target image is shown, according to one or more embodiments. In example 200, the source image 205 is the same as source image 105 described above with reference to FIG. 1, and the target image 210 is the same as the target image 110 described above with reference to FIG. 1. As shown, neural network 230 may be used to extract style representation information (220) from the source image 205 and also to extract content representation information (225) from the target image 210. Neural network 230 may then synthesize (235) various versions of a stylized target image 215. Increasing subsets of the CNN layers may be used to match the style representation of the source image in different manners. For example, the image structures that are able to be captured in the style representation may increase in size and complexity when including style features from higher layers of the neural network. The lower layers in neural network 230 may provide an almost perfect reconstruction of the input image, i.e., from a pixel and content standpoint, whereas the higher layers in neural network 230 may lose some pixel information but preserve higher level content representation from the input image.

According to some embodiments, the process of optimizing the style transfer to the target image may be carried out in a manner similar to the training of a new neural network, wherein the parameters of the network may be used to gradually alter the target image's content over multiple iterations. Such optimization processes may comprise of more than 100, 500, or even 1,000 iterations before settling on the final synthesized stylized image.

Figure 3:
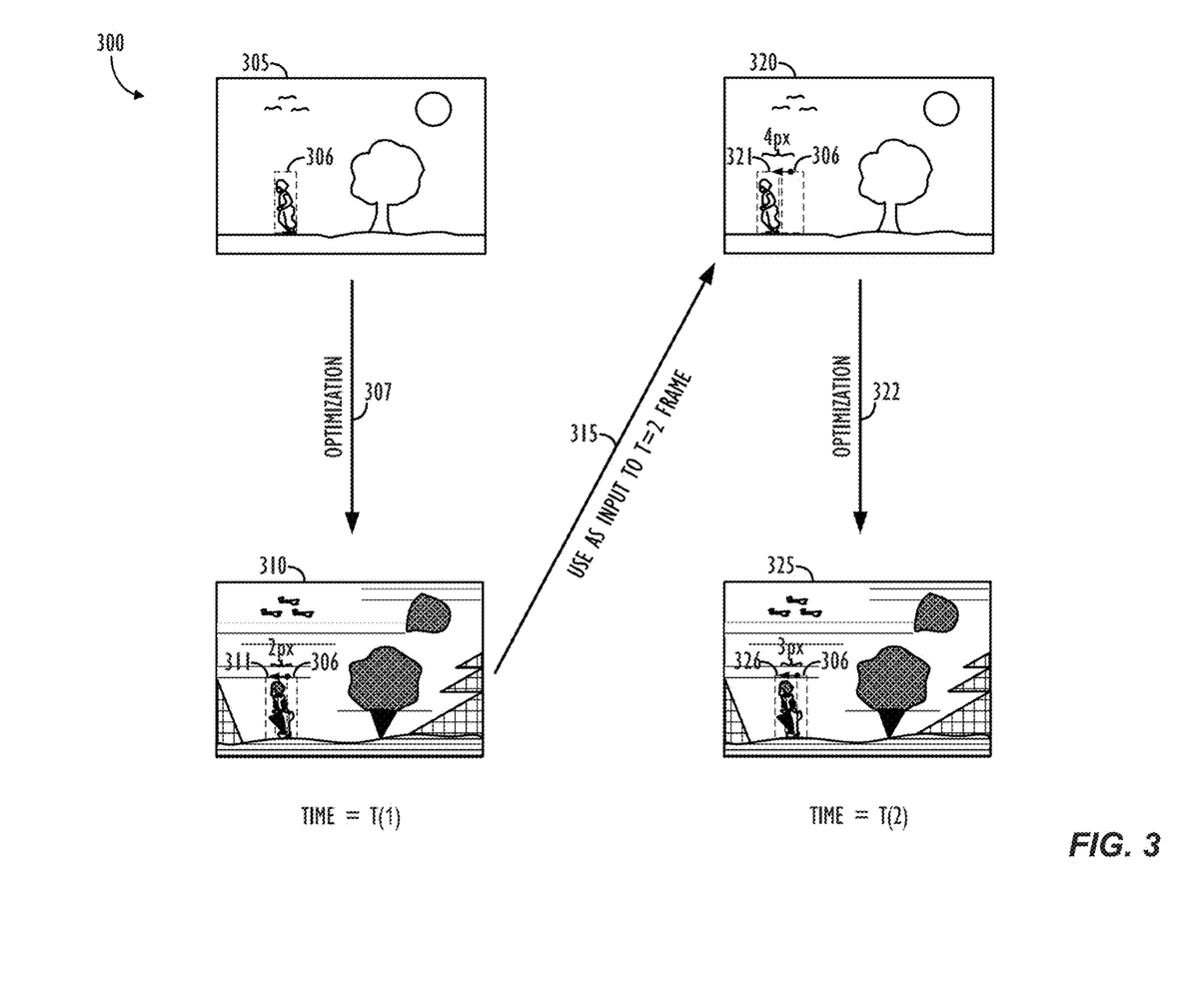
FIG. 3 is an example of an optimization technique for using a neural network to applying an extracted artistic style to a target image, according to one or more embodiments.

Referring now to FIG. 3, an example 300 of an optimization technique for using a neural network to apply an extracted artistic style to a target image is shown, according to one or more embodiments. Image 305 represents a target image captured at a first time, t(1), to which an extracted artistic style is to be applied. Image 305 comprises the same image as target image 110, discussed above in reference to FIG. 1. Box 306 represents the position of the runner in image 305 at time=t(1). Arrow 307 represents the application of the aforementioned optimization process to apply an extracted artistic style (in this case the same style shown in source image 105, discussed above in reference to FIG. 1) to image 305, which will result in stylized target image 310. As shown in FIG. 3, box 311 represents the position of the stylized version of the runner in stylized target image 310, which appears to have moved 2 pixels to the left within the scene, with respect to the unstylized version of the target image 305. Because of the aforementioned stochastic nature of the style application process, the position of various objects in the scene (such as the runner) may fluctuate in position between consecutive stylized versions of the scene—even if the object is not actually moving within the scene. If objects within the scene are moving, this injects even a further level of randomness to the position of the object in subsequent stylized versions of the scene. This randomness is not noticeable when creating a single stylized image, but leads to undesirable jittering and/or flickering around many objects (and even in the backgrounds of scenes) when multiple sequential stylized target images are combined into a stylized video sequence.

Thus, according to some embodiments, the artistic style application process may use the stylized output of a first image, e.g., captured at time=t(1), to guide the application of the artistic style to a second image, e.g., captured at a time=t(2). In this way, rather than starting the optimization process for creating the stylized version of the second image with a random noise image (as is usually done, according to prior art approaches); the process may instead 'seed' the optimization process for the next image to be added to the stylized video sequence with some image from the previous frame. In this way, when the optimization process starts for the second image, the process already knows some information about what the previous frame was like. In the example shown in FIG. 3, the process would, e.g., known that the runner has moved 2 pixels to the left in the stylized version of the first image, so the process could use that knowledge to influence the eventual location of the runner in the stylized version of the second image.

In other embodiments, as will be explained in further detail below, a 'first pass' of stylization may be made over each image in the video sequence, e.g., using a single, pre-trained, style-specific neural network pass. Such a pre-trained, style-specific neural network may, e.g., be trained on a set of pictures with known stylization outputs, and automatically learn (e.g., over the course of thousands—or even millions—of images) the way in which source images should be altered to end up with a desired stylized output image. If such networks are trained and employed, they may be able to replace the prior art iterative optimization process with a 'single pass' operation, thus unlocking the ability to perform the artistic style transfer processes described above on-board devices possessing a comparatively lower level of processing power, e.g., devices such as the personal electronic devices and mobile phones, tablets, etc. often carried by users. Another benefit of this 'single pass' approach is that it keeps private user image data on-board their own devices, rather than having to upload the image data to a more powerful server for remote processing and then receiving the processed results from the remote server.

The stylization of a given or "current" image may be further optimized for the creation of stylized video sequences, e.g., via an interpolation process involving one or more stylized versions of the images captured immediately prior to the "current" image, e.g., the image captured at a time=t(1) in the example of FIG. 3 and/or one or more stylized versions of the images captured immediately after the "current" image, e.g., an image that was captured at a time=t(3) in the example of FIG. 3. In other words, in processes that begin by making a first (i.e., initial) stylization pass over all of the images in the sequence, the optimization process for the second image may be guided based on knowledge of the content of one or more previous initial stylized images and/or one or more subsequent initial stylized images. In some embodiments, the stylized video creation process may be guided in the form of a cost function that is lowered by pixels having a similar position/color content/etc. as the corresponding pixels in a neighboring image. In some embodiments, the iterations of the optimization process may continue for a predetermined number of iterations, or until the cost function goes below a threshold value. In some embodiments, the interpolation process may not simply proceed in an order of incrementing frame indices. Instead, the interpolation process may traverse through the frames according to a randomly-generated permutation of frame indices, e.g., to avoid any undesired local minima of the optimization process and increase the quality of the resultant video sequence.

Turning back to FIG. 3, the arrow 315 represents the aforementioned process of using the stylized output of the first target image captured at the first time as the input to the stylization process of the second target image 320 captured at time=t(2). As shown in the second target image 320, box 321 represents the position of the runner in the second target image 320, which appears to have moved 4 pixels to the left within the scene, with respect to the unstylized version of the target image 305. Because the optimization process has been guided by the information received via arrow 315 in the example of FIG. 3, the application of the artistic style to the second target image 320 may converge more quickly to its final result, and may place the stylized version of the runner (as shown in box 326 in the stylized version of the second target image 325) at either the same location as its position in the stylized version of the first target image 315 or at least closer to its prior location that it would be likely to end up if the optimization process 322 were not seeded with any information from the prior stylized target image in the video sequence. (As mentioned above, in some embodiments, the process may utilize one or more prior-captured initial stylized images and/or one or more subsequently-captured initial stylized images to seed the optimization process.) In the example shown in FIG. 3, in the stylized version of the second target image 325, the runner ends of three pixels to the left of its original position in source image 305, but only one pixel shifted from its position in the first stylized target image 310. The shift of only one pixel may provide for a much less noticeable flicker than if the runner moved by 6 or more pixels between frames, for example. A given implementation may control how much random "flicker" is acceptable in consecutive video frames of the resultant stylized video sequence by adjusting the weights applied by the cost function to pixels of objects that do not match their corresponding pixels in previous video frames. For example, the greater the weight that is applied to mismatches, the more the optimization process will drive the stylized version of the second target image to maintain the stylized versions of the objects at similar positions within the scene as they were located in previous images.

As mentioned above, in other embodiments, one or more forms of interpolation may be applied to the output of a previous and/or subsequently-captured stylized image when determining the application of the extracted artistic style to the "current" image to be included in the stylized video sequence. For example, in one embodiment, the prior image frame's stylized content may be transformed using a function that models the original image content's changes between the prior and current frames (as shown in the example of FIG. 3). Next, the subsequently-captured image's stylized content may be transformed using a function that models the reverse of the original image content's changes between the current and the subsequently-captured frames (i.e., a transformation that works 'backwards' in time from the subsequent frame to the current frame). Finally, all three resulting frames (i.e., the prior, current, and subsequent frames) may be blended together, e.g., using an interpolation function, into what will become a new interpolated initialization frame for the current frame's optimization process.

Once the new interpolated initialization frame is obtained, a number of optimization steps may be performed on the blended interpolated initialization frame, resulting in the final stylized version of the current frame. The interpolation process outlined above may then be repeated for every captured image frame, e.g., until either the content does not change more than a threshold amount after a given optimization pass (i.e., what is known as "convergence") or until a certain number of optimization steps per frame has been performed.

The size of the interpolation 'neighborhood' (i.e., the number of prior and/or subsequent frames that are blended together with current frame's content) may vary over time. For example, early in the optimization process, the number of frames contributing to producing a target frame's content may be larger, and then the number of neighboring frames used may decrease as the optimization process progresses. Having a larger neighborhoods of frames contributing to the interpolation process may help to quickly achieve the initial smoothness of the produced output video. Later—and especially towards the end of the optimization process—reducing the size of the interpolation neighborhood may be employed to help reduce some of the more fine-grained imperfections resulting from frame-to-frame differences.

In some embodiments, the final step of the stylization process (i.e., applying the optimization steps to the interpolated initialization frame) may also be replaced by a single neural network pass using a pre-trained style-specific neural network (e.g., as was done in the 'first pass' process described above) on the interpolated initialization frame. This may have the beneficial effect of speeding up and simplifying the stylized video creation process even further.

This interpolation process may be beneficial to the creation of the resulting stylized video sequence, at least in part, because the position of objects is likely to change (at least a small amount) between the stylized version of the scene and the unstylized version of the next captured frame of the scene, and the interpolation process may, in some instances, help to soften these differences and lead the optimization process to 'converge' more quickly on an artistically acceptable result.

In still other embodiments of the stylized video creation processes described herein, the source image data may be decimated, e.g., from a source frame rate of 30 frames per second (fps) to 15 fps in the output stylized video sequence, meaning that every other frame of the source image data may be deleted before the application of the extracted artistic style, thus increasing the potential for jitter in the output stylized video if the process is not guided in some fashion by the output of previous image frames in the sequence, e.g., as is described above.

Figure 4A:
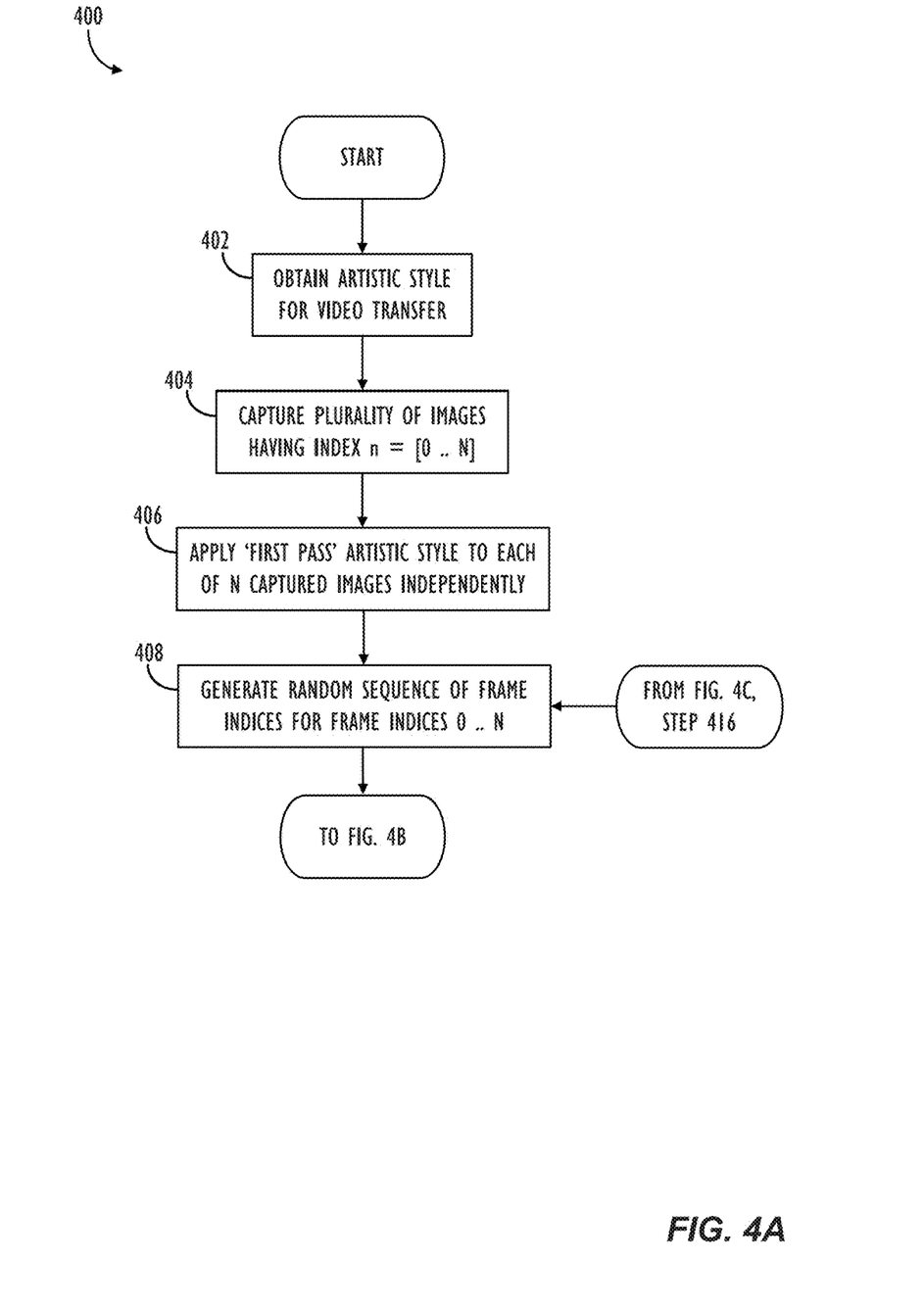
FIGS. 4A-4C are flowcharts illustrating a technique for assembling a stylized video sequence, according to one or more embodiments.

Referring now to FIG. 4A, a flowchart 400 illustrating a technique for assembling a stylized video sequence is shown, according to one or more embodiments. First, the process may begin at Step 402 by obtaining an artistic style to use for the video transfer. In some embodiments, a user may simply select the artistic style that he or she wishes to apply, e.g., from a list of paintings, artists, or predetermined available artistic style "filters." In other embodiments, the artistic style may be a customizable combination of multiple paintings, artists, and/or predetermined available artistic style "filters." In still other embodiments, the process may be able to automatically classify a scene as being of a particular type (e.g., a sunset), and then select or suggest a predetermined artistic style based on the determined scene classification (e.g., one or more artistic styles developed based on paintings of sunsets by certain artists). Applying artistic styles that are contextually related to the content of the target image has been found to produce more visually pleasing results in some circumstances.

Next, at Step 404, the process may capture a plurality of images to be assembled into the stylized video sequence. For example, the plurality of images may have an index, n, which ranges in value from 0 up to N. Next, at Step 406, the process may apply a 'first pass' artistic style to each of the N images independently, e.g., using one of the aforementioned pre-trained, style-specific neural networks, to create an initial stylized version of each image. Next, the process may proceed to Step 408, wherein a random permutation of frame indices may be generated. Next, the process may proceed to the flowchart 440 shown in FIG. 4B.

Figure 4B:
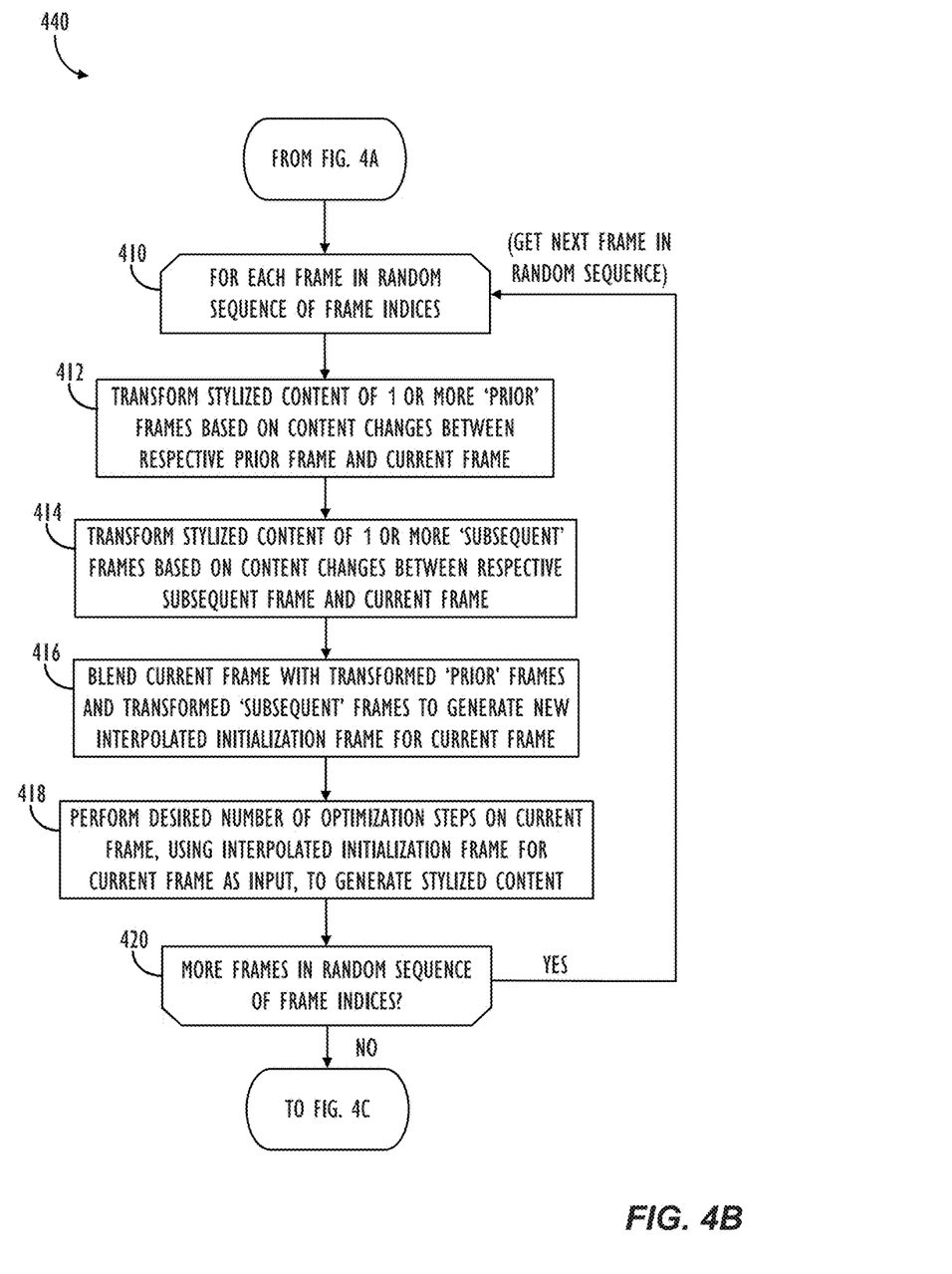

Turning now to the flowchart 440 shown in FIG. 4B, at Step 410, a for-loop process is initialized at Step 410 to iterate over each of the frames, according to the random sequence of frame indices generated at Step 408 in FIG. 4A. Proceeding to Step 412, for each "current" frame index in the random sequence of generated frame indices, the process may transform one or more prior image frame's (i.e., image frames captured prior to the current image) stylized content may be transformed using a function that models the current image's content changes between the respective prior frame and the current frame. Next, at Step 414, one or more subsequent image frame's (i.e., image frames captured subsequently to the current image) stylized content may be transformed using a function that models the reverse of the current image's content changes between the current frame and the respective subsequent frame (i.e., the transformation 'backwards' in time from the respective subsequent frame to the current frame). Next, at Step 416, all resulting transformed frames (i.e., the one or more prior frames, the current frame, and the one or more subsequent frames) may be blended together, e.g., using an interpolation function, into what will become a new interpolated initialization frame for the current frame's optimization process. At Step 418, the process may perform a desired number of optimization steps on the blended frame received from Step 416, thus resulting in a new stylized content version of the current frame. According to some embodiments, the application of the optimization steps to the interpolated frame at Step 418 may be replaced by a 'single pass' operation, similar to that described above with reference to the initial independent application of the artistic style to the captured frames at Step 406. At Step 420, if there are more frames in the random sequence of frame indices (i.e., "YES" at Step 420), the process may return to Step 410 and update the "current frame" to be the next frame in the generated random sequence of frame indices. Once the end of the random sequence of frame indices has been reached, (i.e., "NO" at Step 420), the process may proceed on to the flowchart 460 shown in FIG. 4C.

Figure 4C:
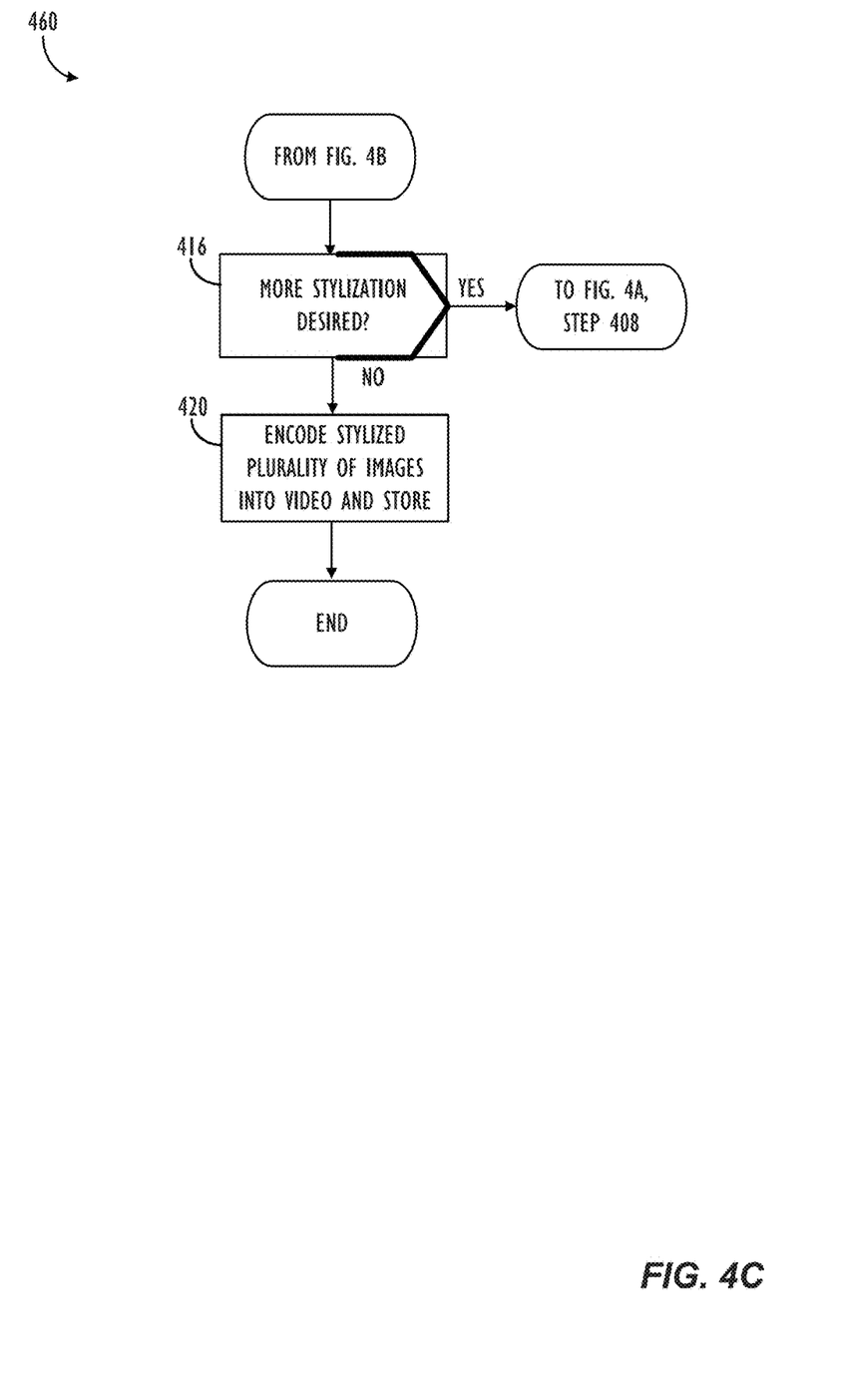

Turning now to the flowchart 460 shown in FIG. 4C, if more stylization of the target images is desired (i.e., "YES" at Step 416), the process may return to Step 408 of FIG. 4A, in order to generate a new random sequence of frame indices. If so desired, the process may also change or update some of the stylization parameter(s) before the execution of the next stylization pass, e.g., the various neural network parameters or the size of the "interpolation neighborhood," i.e., the number of prior and subsequent frames pulled into the blending process by Steps 412 and 414, respectively. Once the desired level of stylization for a given video sequence has been achieved (i.e., "NO" at Step 416, the process may proceed to Step 420 to encode each of the stylized plurality of images into a video sequence and, optionally, store the stylized video sequence in memory. As is to be understood, any optimization (or combination of optimization processes) may be employed in the application of the artistic style to the captured image at Steps 406 and 418, e.g., the aforementioned 'single pass' optimization process or a more traditional iterative optimization approach to the application of the artistic style.

Figure 5:
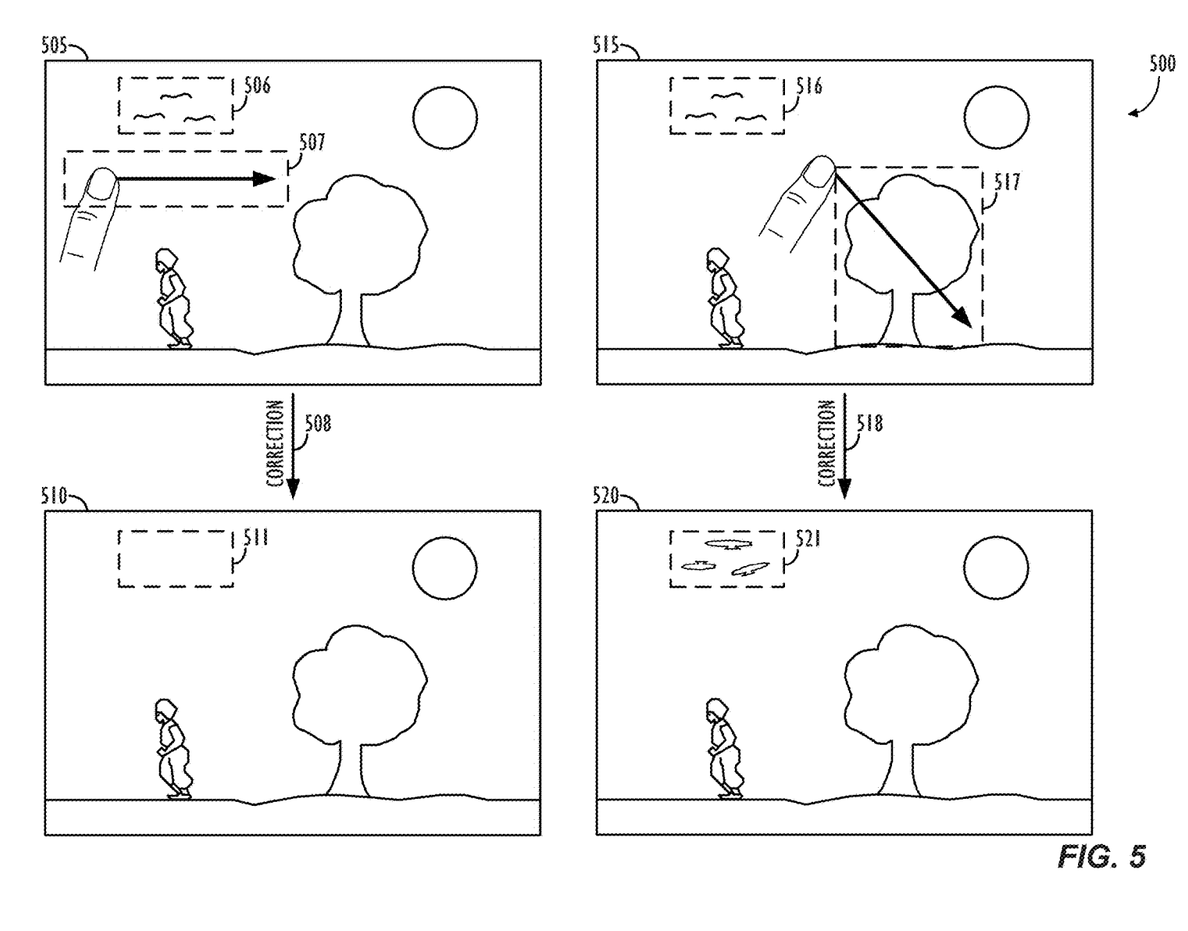
FIG. 5 shows two examples of the application of an extracted artistic style from a first portion of an image to content correct a second portion of the image containing undesired artifacts, according to one or more embodiments.

Referring now to FIG. 5, two examples 500 of the application of an extracted artistic style from a first portion of an image to content correct a second portion of the image containing undesired artifacts is shown, according to one or more embodiments. In the first example, source image 505 is designated for automated content correction via the application of an artistic style. In the first example, region 506 has been designated as containing one or more undesired artifacts, in this case, the three birds flying in the sky in the scene. Semantic information from the first target image corresponding to the one or more undesired artifacts (i.e., region 506) may be obtained from a user (or programmatically) via any suitable input mechanism, e.g., a touchscreen display, input from a mouse, keyboard, or microphone, etc. In the same first example, region 507 has been designated as the portion of source image 505 from which the artistic style is to be extracted. As with region 506, region 507 may be indicated by a user (or programmatically) via any suitable input mechanism, e.g., a touchscreen display (as is shown in the example of FIG. 5), input from a mouse, keyboard, or microphone, etc. In the example of FIG. 5, the source image (from which the artistic style will be extracted) and the target image (that is to be automatically content-corrected) happen to be the same image (i.e., image 505), but this is not strictly necessary. For example, the best source to correct a picture of a wall with unwanted graffiti on it may a picture of a different portion of the wall without graffiti on it or a picture of the same portion of the wall at an earlier point in time, e.g., before the graffiti was placed on it.

In this example, the clear sky in region 507 has been designated as the source of the artistic style that will be used to replace the birds in region 506. Thus, arrow 508 represents the aforementioned neural network generation process (in this case, based on the content within region 507 of image 505, rather than from a painting or other work of art) and the application of the generated neural network to the region 506 of the target image. In this example, because the portion of the source image from which the style has been extracted (i.e., region 507) may contain nothing but uniform blue-colored pixels with very little detail or variation, the network will be likely to "correct" the birds in region 506 by replacing them with similar uniform blue-colored pixels with very little detail that match the surrounding portions of the sky in image 505. To further enhance the automatic content correction process, the content-corrected regions of the first target image (i.e., region 511 in content-corrected image 510) may be blended together, e.g., using a Poisson blending technique, with the uncorrected regions of the first target image, so as to soften the transition between the corrected and uncorrected portions of the first target image.

Turning now to the second example shown in FIG. 5, i.e., the example involving the automatic content correction of image 515, the tree in region 517 has been designated as the source of the artistic style that will be used to replace the birds in region 516. Again, semantic information from the first target image corresponding to the one or more undesired artifacts (i.e., region 516) may be obtained from a user (or programmatically) via any suitable input mechanism, e.g., a touchscreen display, input from a mouse, keyboard, or microphone, etc. Arrow 518 represents the aforementioned neural network generation process (in this case, based on the content within region 517 of image 515, rather than from a painting or other work of art) and the application of the generated neural network to the region 516 of the target image. In this example, because the portion of the source image from which the style has been extracted (i.e., region 517) contains a tree which may contain color such as green and brown, leaf and branch like textures, and the distinctive shape of a large tree, the network will be likely to "correct" the birds in region 521 of content-corrected image 520 by replacing them with similarly-sized objects that either contain colors similar to those colors present in the tree, textures similar to the leaves and branches found in the source tree, and/or edges similar to those found in the shape of the tree. Thus, content-corrected image 520 is an example of a case wherein the style extracted from the portion of the source image indicated by the user did not provide a good content correction for the one or more undesired artifacts, i.e., the three birds, in image 515. If instead, the birds had been flying in front of the tree in the scene, then perhaps selecting a portion of the trees leaves as the portion of the source image from which the artistic style was to be extracted would actually create an artistic style that would be able to successfully and seamlessly remove the appearance of the birds from in front of the trees.

Thus, in some embodiments, the portion of the source image used to correct the one or more undesired artifacts (and/or the location of undesired artifacts in the image) may be suggested to the user programmatically (e.g., based on object recognition or other image analysis techniques to identify potentially unwanted artifacts). In still other embodiments, the content correction process may further provide the user with a preview of how the proposed content-correction would look if it were based on the currently-selected portion of the source image and location of the one or more undesired artifacts, thus providing the user with a chance to select a different source image or portion of a source image that would provide for more effective correction of the one or more undesired artifacts.

Figure 6:
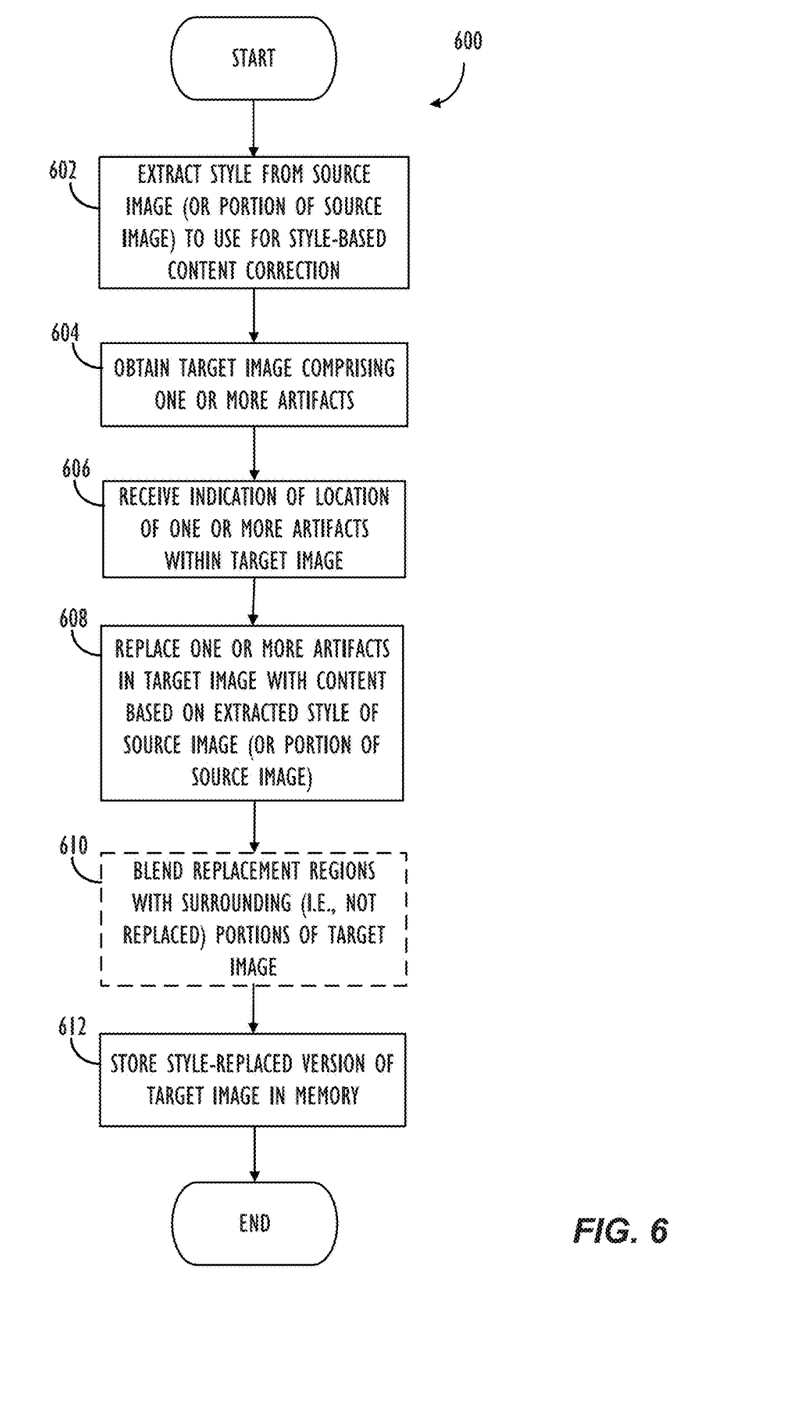
FIG. 6 is a flowchart illustrating a technique for applying an extracted artistic style from a first portion of an image to content correct a second portion of the image containing undesired artifacts, according to one or more embodiments.

Referring now to FIG. 6, a flowchart 600 illustrating a technique for applying an extracted artistic style from a first portion of an image to content correct a second portion of the image containing undesired artifacts is shown, according to one or more embodiments. First, the process may begin at Step 602 by extracting an artistic style from a source image (or a portion of the source image) to use for the style-based content correction. This designation of the portion of the source image to extract the artistic style from may, e.g., come in the form of a designated region of interest (ROI), coordinates defining one or more polygonal regions within the image, a set of coordinate points defining one or more regions in the image, and/or touch input that has 'brushed' over the image at the location(s) where the user desires to pull the artistic style from. Next, at Step 604, the process may obtain a target image comprising one or more undesired artifacts. As mentioned above, in some embodiments, the source image and the target image may comprise the same image. Next, at Step 606, the process may obtain semantic information corresponding to the location of the one or more undesired artifacts in the target image. This information may, e.g., come in the form of a designated region of interest (ROI), coordinates defining one or more polygonal regions within the image, a set of coordinate points defining one or more regions in the image, and/or touch input that has 'brushed' over the image at the location(s) of the undesired artifacts.

Next, at Step 608, the process may replace the one or more undesired artifacts in the target image with content based on the extracted artistic style of the source image (or portion of the source image) designated in Step 602. Next, at Step 610, the process may optionally blend the replacement regions, i.e., the regions where the artistic style has been applied to perform the automated content correction, with the surrounding regions of the target image, i.e., the regions that have not been content replaced, in order to soften the transitions from content-replaced regions to regions where the content has not been replaced. Finally, at Step 612, the style-replaced version of the target image may be stored in memory.

Figure 7:
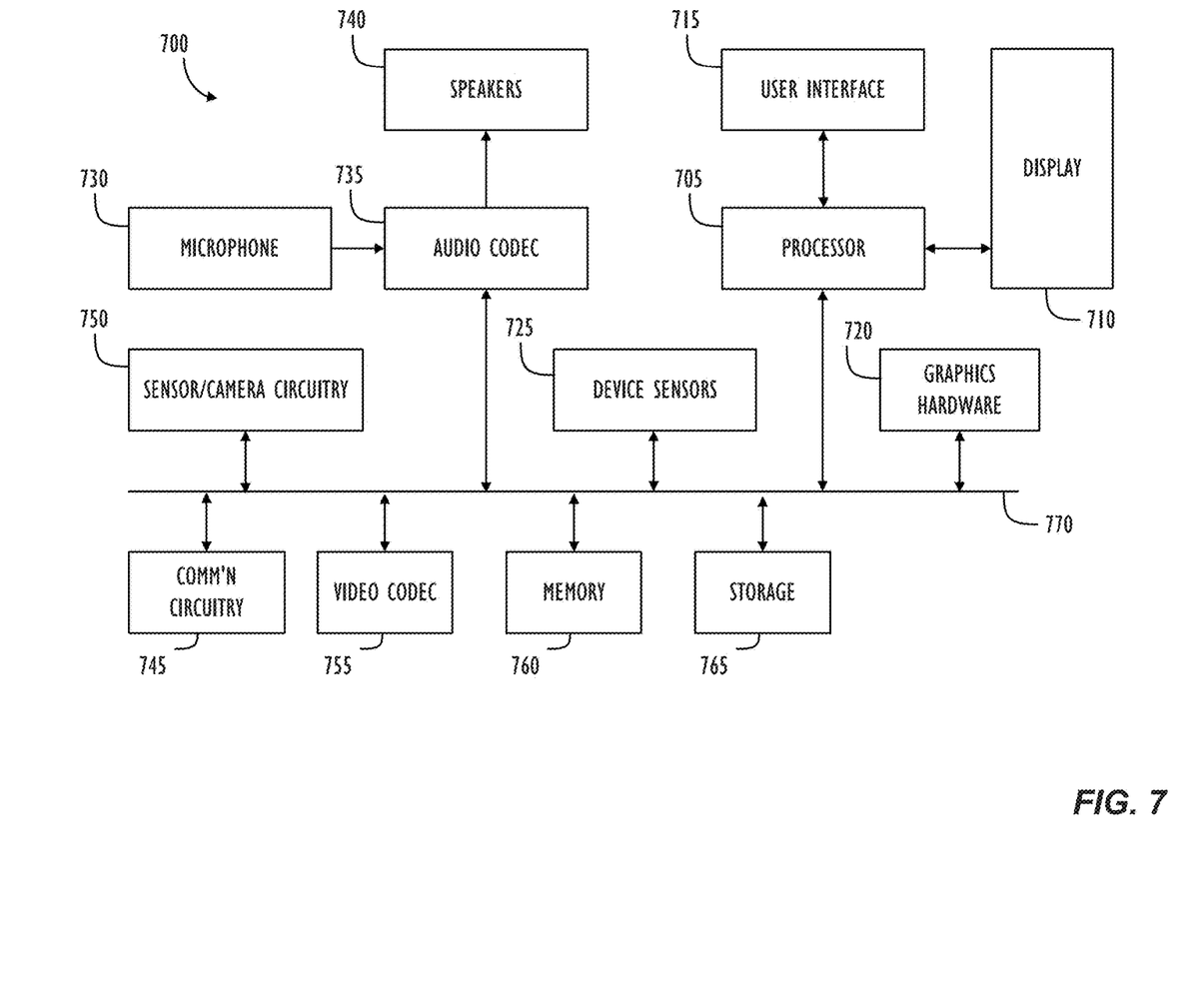
FIG. 7 is a block diagram illustrating a programmable electronic device, in which one or more of the techniques disclosed herein may be implemented.

Referring now to FIG. 7, a simplified functional block diagram of illustrative programmable electronic device 700 is shown according to one embodiment. Electronic device 700 could be, for example, a mobile telephone, personal media device, portable camera, or a tablet, notebook or desktop computer system. As shown, electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, image capture circuit or unit 750, which may, e.g., comprise multiple camera units/optical sensors having different characteristics, video codec (s) 755, memory 760, storage 765, and communications bus 770.

Processor 705 may execute instructions necessary to carry out or control the operation of many functions performed by device 700 (e.g., such as the generation and/or processing of images in accordance with the various embodiments described herein). Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may view a captured video stream and/or indicate particular frame(s) that the user would like to have a particular stabilization constraint(s) applied to (e.g., by clicking on a physical or virtual button at the moment the desired frame is being displayed on the device's display screen). In one embodiment, display 710 may display a video stream as it is captured while processor 705 and/or graphics hardware 720 and/or image capture circuitry contemporaneously generate a fused version of the captured video stream, storing the video stream in memory 760 and/or storage 765. Processor 705 may be a system-on-chip such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable graphics processing units (GPUs).

Image capture circuitry 750 may comprise one or more camera units configured to capture images, e.g., images which may be processed to generate stylized versions of said captured images, e.g., in accordance with this disclosure. Output from image capture circuitry 750 may be processed, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705, graphics hardware 720, and image capture circuitry 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705 such computer program code may implement one or more of the methods described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. An image processing method, comprising:
obtaining a first source image;
extracting an artistic style from at least a portion of the first source image, wherein the extracted artistic style is stored as a plurality of layers in a convolutional neural network;
obtaining a first target image comprising one or more undesired artifacts;
obtaining semantic information from the first target image corresponding to the one or more undesired artifacts;
applying, using the plurality of layers stored in the convolutional neural network, the extracted artistic style to the first target image in accordance with the semantic information to repair the one or more undesired artifacts, thereby creating a content corrected version of the first target image; and
storing the content corrected version of the first target image in a memory.

2. The method of claim 1, wherein:
the first source image and the first target image are the same image.

3. The method of claim 2, wherein:
the at least a portion of the first source image does not contain any of the one or more undesired artifacts.

4. The method of claim 1, wherein obtaining the semantic information further comprises:
obtaining an indication of a location within the first target image of each of the one or more undesired artifacts.

5. The method of claim 1, wherein:
applying the extracted artistic style to the first target image comprises utilizing an optimization process.

6. The method of claim 1, further comprising:
obtaining an indication of a location of the at least a portion of the first source image from which the artistic style is extracted.

7. A non-transitory program storage device comprising instructions stored thereon to cause one or more processors to:
obtain a first source image;
extract an artistic style from at least a portion of the first source image, wherein the extracted artistic style is stored as a plurality of layers in a convolutional neural network;
obtain a first target image comprising one or more undesired artifacts;
obtain semantic information from the first target image corresponding to the one or more undesired artifacts;
apply, using the plurality of layers stored in the convolutional neural network, the extracted artistic style to the first target image in accordance with the semantic information to repair the one or more undesired artifacts, thereby creating a content corrected version of the first target image; and
store the content corrected version of the first target image in a memory.

8. The non-transitory program storage device of claim 7, wherein:
the first source image and the first target image are the same image.

9. The non-transitory program storage device of claim 7, wherein the instructions to obtain the semantic information further comprise instructions to:
obtain an indication of a location within the first target image of each of the one or more undesired artifacts.

10. The non-transitory program storage device of claim 7, wherein the instructions to apply the artistic style to the first target image further comprise instructions to:
utilize an optimization process.

11. The non-transitory program storage device of claim 10, further comprising instructions stored thereon to cause the one or more processors to:
obtain an indication of a location of the at least a portion of the first source image from which the artistic style is extracted.

12. A device, comprising:
a memory;
a user interface;
one or more processors operatively coupled to the memory and the user interface, wherein the one or more processors are configured to execute instructions causing the one or more processors to:
obtain a first source image;
extract an artistic style from at least a portion of the first source image, wherein the extracted artistic style is stored as a plurality of layers in a convolutional neural network;
obtain a first target image comprising one or more undesired artifacts;
obtain semantic information from the first target image corresponding to the one or more undesired artifacts;
apply, using the plurality of layers stored in the convolutional neural network, the extracted artistic style to the first target image in accordance with the semantic information to repair the one or more undesired artifacts, thereby creating a content corrected version of the first target image; and
store the content corrected version of the first target image in the memory.

13. The device of claim 12, wherein:
the first source image and the first target image are the same image.

14. The device of claim 13, wherein:
the at least a portion of the first source image does not contain any of the one or more undesired artifacts.

15. The device of claim 12, wherein the instructions to obtain the semantic information further comprise instructions to:
obtain an indication of a location within the first target image of each of the one or more undesired artifacts.

16. The device of claim 12, wherein the instructions to apply the artistic style to the first target image further comprise instructions to:
utilize an optimization process.

17. The device of claim 16, wherein the one or more processors are further configured to execute instructions causing the one or more processors to:
obtain an indication of a location of the at least a portion of the first source image from which the artistic style is extracted.

* * * * *